US012774874B2

(12) United States Patent
Kim

(10) Patent No.: US 12,774,874 B2
(45) Date of Patent: Oct. 27, 2026

(54) METHOD AND APPARATUS FOR DETECTING LOCATION OF DART PIN

(71) Applicant: Electronics and Telecommunications Research Institute, Daejeon (KR)

(72) Inventor: Do Hyung Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 18/435,861

(22) Filed: Feb. 7, 2024

(65) Prior Publication Data

US 2024/0271916 A1 Aug. 15, 2024

(30) Foreign Application Priority Data

Feb. 10, 2023 (KR) ........................ 10-2023-0017989

(51) Int. Cl.

| | |
|---|---|
| ***F41J 5/02*** | (2006.01) |
| ***F41J 3/00*** | (2006.01) |
| ***G06T 7/70*** | (2017.01) |
| ***H04N 23/957*** | (2023.01) |

(52) U.S. Cl.

CPC ............... *F41J 5/02* (2013.01); *F41J 3/0009* (2013.01); *G06T 7/70* (2017.01); *H04N 23/957* (2023.01); *G06T 2207/10016* (2013.01); *G06T 2207/10052* (2013.01); *G06T 2207/20221* (2013.01)

(58) Field of Classification Search

CPC ..... F41J 3/0009; F41J 5/02; F41J 5/10; G06T 2207/10016; G06T 2207/10052; G06T 2207/20221; G06T 7/70; H04N 23/957

See application file for complete search history.

(56) References Cited

U.S. PATENT DOCUMENTS

| | | | | |
|---|---|---|---|---|
| 10,962,336 | B2 | 3/2021 | Aldridge et al. | |
| 2014/0267833 | A1* | 9/2014 | Chen | G06T 5/73 348/239 |
| 2017/0307341 | A1* | 10/2017 | Hollinger | F41J 5/14 |
| 2018/0288307 | A1 | 10/2018 | Allie et al. | |
| 2019/0113313 | A1 | 4/2019 | Hong | |
| 2022/0292709 | A1 | 9/2022 | Kim | |
| 2022/0341716 | A1 | 10/2022 | McNally et al. | |

FOREIGN PATENT DOCUMENTS

| | | |
|---|---|---|
| KR | 10-2018-0059802 A | 6/2018 |
| KR | 10-2022-0128917 A | 9/2022 |

OTHER PUBLICATIONS

Lou et al, "All-in-focus Imaging from Event Focal Stack", 2022 (Year: 2022).*

* cited by examiner

*Primary Examiner* — Ruiping Li

(74) *Attorney, Agent, or Firm* — BROADVIEW IP LAW, PC

(57) ABSTRACT

A method of detecting the location of a dart pin is disclosed by the present disclosure, of which at least one embodiment provides a method of detecting a location of a dart pin attached to a dart target plate, including generating refocused images for multiple preset focal planes based on plenoptic videos of the dart target plate, which are obtained by using one or more cameras disposed around the dart target plate, generating, based on the refocused images, an extracted image for an object dart pin located in one focal plane of the multiple preset focal planes, and determining an attachment location of the object dart pin based on the extracted image.

15 Claims, 5 Drawing Sheets

METHOD AND APPARATUS FOR DETECTING LOCATION OF DART PIN

CROSS-REFERENCE TO RELATED APPLICATIONS

This application claims the benefit of priority to Korean Patent Application No. 10-2023-0017989, filed in the Korean Intellectual Property Office on Feb. 10, 2023, the entire contents of which are incorporated herein by reference.

TECHNICAL FIELD

The present disclosure in some embodiments relates to a method and apparatus for detecting the location of a dart pin or point. More particularly, the present disclosure relates to a method and apparatus for detecting the exact location of a dart pin attached to a dart target, even in the presence of mutual occlusion of a plurality of dart pins attached to the dart target, by using a plurality of refocused images obtained from a planar optical image.

BACKGROUND

The statements in this section merely provide background information related to the present disclosure and do not necessarily constitute prior art.

In general, dart-throwing or darts, which means "small arrows," is a game of throwing an arrow-shaped dart pin at a centrally marked bull's-eye target with written scores, and the score corresponding to the location of the dart pin is calculated to determine the winner. The advantage of darts is to offer a game for anyone to enjoy anytime, anywhere, just by having a small arrow-shaped dart pin and a dart target. In recent years, various game methods and dart game devices have been popularized, and it has developed into a global leisure sport.

To calculate a dart game score, the exact location of the dart pin on the dart target needs to be detected. Prior art dart game devices utilize either mechanical or image-based methods to detect the location of the dart pin. In the mechanical method, a pressure sensor or the like is installed in the dart target area, and the location of the dart pin is detected based on the sensing data detected at the point where the dart pin is attached. The image-based method installs one or more cameras around the dart target or at a specific location on the dart game device and detects the location of the dart pin based on the images taken by the cameras.

Generally, a plurality of dart pins are attached to a dart target in the course of a dart game. In particular, the plurality of dart pins may be concentrated in some areas because the score depends on the location on the dart target. In this case, the plurality of dart pins attached to adjacent locations may be obscured from each other in the captured image of the dart target, making it difficult to detect the exact location of the dart pin.

SUMMARY

The following summary presents a simplified summary of certain features. The summary is not an extensive overview and is not intended to identify key or critical elements.

The present disclosure aims to generate an extracted image for an object dart pin based on a plurality of refocused images obtained from plenoptic videos of a dart target plate and to detect an accurate attachment location of the object dart pin.

The objects of the present disclosure are not limited to those particularly described hereinabove, and the above and other objects that the present disclosure could achieve will be clearly understood by those skilled in the art from the following detailed description.

According to at least one embodiment, the present disclosure provides a method of detecting the location of a dart pin attached to a dart target plate, including generating refocused images for multiple preset focal planes based on plenoptic videos of the dart target plate, which are obtained by using one or more cameras disposed around the dart target plate, generating, based on the refocused images, an extracted image for an object dart pin located in one focal plane of the multiple preset focal planes, and determining an attachment location of the object dart pin based on the extracted image.

According to another embodiment, the present disclosure provides an apparatus for detecting the location of a dart pin, including one or more cameras disposed around a dart target plate, a memory configured to store one or more instructions, and one or more processors configured to execute the one or more instructions stored in the memory, wherein the processor, by executing the one or more instructions, performs steps including generating refocused images for multiple preset focal planes based on plenoptic videos of the dart target plate, which are obtained by using the cameras disposed around the dart target plate, generating, based on the refocused images, an extracted image for an object dart pin located in one focal plane of the multiple preset focal planes, and determining an attachment location of the object dart pin based on the extracted image.

According to at least one embodiment, the present disclosure generates an extracted image for an object dart pin based on a plurality of refocused images obtained from plenoptic videos of the dart target plate, and detects an accurate attachment location of the object dart pin, allowing a dart game score to be accurately calculated even when the object dart pin is obscured by another dart pin to enable a carefree dart game to be played.

The benefits of the present disclosure are not limited to those mentioned above, and other benefits not mentioned herein will be clearly understood by those skilled in the art from the following description. These and other features and advantages are described in greater detail below.

Figure 1:
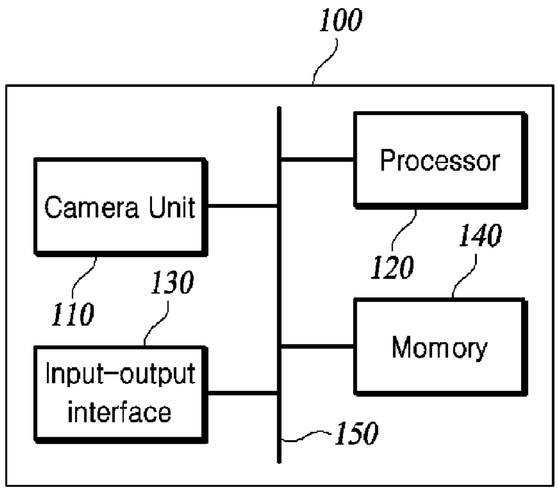
FIG. 1 is a block diagram of a dart pin locating apparatus.

| REFERENCE NUMERALS | |
|---|---|
| 100: dart pin locating apparatus | 110: camera unit |
| 120: processor | 130: input-output interface |
| 140: memory | |

DETAILED DESCRIPTION

Hereinafter, some examples of the present disclosure will be described in detail with reference to the accompanying drawings. In the following description, like reference numerals preferably designate like elements, although the elements are shown in different drawings. Further, in the following description of some examples, a detailed description of related known components and functions when considered obscuring the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

The detailed description set forth below in conjunction with the appended drawings is intended to describe exemplary examples of the present disclosure and is not intended to represent the only examples in which the present disclosure may be practiced.

As used below, singular terms may include plural terms unless otherwise specified.

FIG. 1 is a block diagram of a dart pin locating apparatus according to at least one embodiment of the present disclosure.

Referring to FIG. 1, a dart pin location detecting apparatus or dart pin locating apparatus 100 includes all or part of a camera unit 110, a processor 120, an input-output interface 130, and a memory 140. Here, the camera unit 110, processor 120, input-output interface 130, and memory 140 are capable of transmitting data to each other via a bus 150.

Not all of the blocks illustrated in FIG. 1 are requisite components of the dart pin locating apparatus 100, and in other embodiments, some blocks included in the dart pin locating apparatus 100 may be added, changed, or deleted.

The camera unit 110 may capture plenoptic videos of the dart target plate by using at least one or more cameras disposed around the dart target plate. Here, the plenoptic video contains plenoptic information on a preset spatial dart-target region inclusive of the dart target plate based on three-dimensional optical information such as the directions and intensities of light reflected from all points within the spatial dart-target region. The plenoptic video may be generated by combining plenoptic information obtained from multiple equally spaced cameras.

The camera unit 110 includes at least one or more cameras disposed around the dart target plate. Here, the at least one camera may be, but is not limited to, a single light field camera including a lens array. For example, the at least one camera may be a plurality of cameras disposed around the dart target plate at preset intervals to generate plenoptic information.

Here, the plurality of cameras may be implemented to include at least one of a pinhole camera and a light field camera including a lens array. For example, the plurality of cameras may be implemented to include a light field camera at each of two or more preset points around the dart target plate, or a pinhole camera at a plurality of points at preset intervals to act as a single light field camera. Further, a single light field camera or pinhole camera may be implemented to generate plenoptic information as it moves through the plurality of preset spaced points and generate plenoptic videos based on the plenoptic information.

The processor 120 generates a refocused image for the multiple preset focal planes based on the plenoptic videos of the dart target plate.

The plenoptic video of the dart target plate includes plenoptic information of the plurality of focal planes parallel to the camera plane. The processor 120 changes the focal plane for the spatial dart-target region inclusive of the dart target plate to generate refocused images of the respective ones of the multiple preset focal planes.

The multiple preset focal planes may be set at regular intervals on the scoring region of the dart target plate based on a distance from the camera plane. For example, the multiple preset focal planes may include n focal planes disposed at regular intervals from the camera plane, from a first focal plane including the nearest boundary point of the scoring area to a nth focal plane including the farthest boundary point of the scoring area.

The refocused image for one focal plane sharply exhibits objects located on that focal plane and exhibits other objects blurred. For example, among a plurality of dart pins attached to the dart target plate, a dart pin of interest located in the same plane as the focal plane appears relatively sharp in the refocused image, and other dart pins located at points closer to or farther away than the dart pin of interest from the camera position, which is a reference position, appear relatively blurred as their distances from the focal plane increase.

The processor 120 sequentially performs refocusing on multiple preset focal planes having different focal lengths to generate a plurality of refocused images equal in number to the focal planes. Here, the plurality of refocused images may constitute a focal stack, which is a set of plenoptic images of the dart target plate.

Based on the plurality of refocused images, the processor 120 generates an extracted image for an object dart pin located in any one focal plane of the multiple preset focal planes.

The processor 120 determines, among the refocused images for the multiple preset focal planes, one refocused image with the object dart pin located in its focal plane, as the reference refocused image. Here, the processor 120 may determine the reference refocused image based on, but is not limited to, whether the object dart pin is detected in a region of pixels having a high sharpness among the pixels constituting the one refocused image. For example, the present disclosure may use an object detection model trained to detect a dart pin of a certain sharpness or higher to detect a dart pin for each of a plurality of refocused images for the multiple preset focal planes and determine any one refocused image with the object dart pin detected, as the reference refocused image.

The processor 120 generates the extracted image for the object dart pin by merging the reference refocused image with at least one other refocused image among the refocused images for the multiple preset focal planes.

In a refocused image, the shapes of objects present in the relevant focal plane are sharpened and the shapes of other objects are blurred. Thus, in the reference refocused image, the shape of the object dart pin present in the focal plane is sharpened, but the shapes of all other dart pins not present in the focal plane are blurred.

On the other hand, other refocused images may have a different focal plane than the reference refocused image, such that the object dart pin may appear blurred and the other dart pins may appear sharp. For example, if the other dart pin is present in the focal plane of another refocused image, the other dart pin may appear sharp and the object dart pin may appear blurred. In another example, if no dart pins are present in the focal plane of another refocused image, the shapes of all dart pins present in the refocused image may be blurred.

The processor 120 calculates a weighted sum by applying different weights to the reference refocused image and one or more other refocused image. Specifically, the processor 120 may apply a preset first weight to the reference refocused image that sharply exhibits a region with the object dart pin and apply a second weight having a value that is relatively smaller than the first weight to the other refocused image that sharply exhibits a region without the object dart pin.

Based on the weighted sum values for the differently weighted reference refocused image and the other refocused images, the processor 120 generates an extracted image for the object dart pin, which is a merger of the plurality of refocused images.

As a result of applying the first weight of a relatively larger value to the reference refocused image than to the other refocused images, the difference, on the merged image, between the sharpness of the objects existing in the focal plane corresponding to the reference refocused image and the sharpness of the objects existing in the other focal plane becomes larger. Over the extracted image, the region with the object dart pin becomes sharply visible relative to the other regions. Thus, among a plurality of dart pins attached to the dart target plate, the shape of the object dart pin appears with high sharpness, while the other dart pins may be blurred or removed due to a decrease in sharpness.

Here, the weight may be applied to pixel values in the corresponding refocused image but is not limited to be applied to the pixel values in the corresponding refocused image. For example, a Laplace filter may be applied to the refocused image. The resultant filtered image or the refocused image may give a blur metric as a basis for obtaining pixel location-specific sharpness values. The weight may be applied to pixel location-specific sharpness values to selectively enhance the sharpness of the object dart pin located in the focal plane corresponding to the reference refocused image in the extracted image.

The processor 120 calculates the attachment location of the object dart pin based on the extracted image.

The processor 120 detects the object dart pin present in the extracted image by using a dart pin detection model pre-trained by using a deep learning algorithm. Here, the pre-trained dart pin detection model may be a detection model based on a deep learning algorithm that is trained to detect a dart pin present in the extracted image by using a dart target plate image including dart pins attached to various locations as training data. The dart pin detection model may include, but is not limited to, deep learning object detection models such as Region with Convolutional Neural Network (R-CNN), Fast R-CNN, Faster R-CNN, Mask R-CNN, You Only Look Once (YOLO), and SSD, and may include various other algorithm-based deep learning object detection models.

The processor 120 generates the location information of the object dart pin based on the detection data for the object dart pin, outputted by the dart pin detection model. Here, the detection data for the object dart pin may be data regarding the location and size of the dart pin, such as a center coordinate value, an elevation, and a width of a bounding-box for the detected object dart pin region.

The processor 120 may generate the location information of the object dart pin based on the coordinates of a preset reference point on the extracted image. The preset reference point may be set to a location where the object dart pin is attached, such as a point where the tip of the dart pin and the dartboard plate are in contact. For example, the reference point may be set to a point corresponding to the bottom center of the bounding-box for the object dart pin area. Based on the horizontal coordinates of the reference point in the extracted image, the processor 120 may generate location information regarding how far the location where the object dart pin is attached is to the left or right of a reference line set along the frontal optical axis of the camera.

The processor 120 may calculate the exact attachment point of the object dart pin by using information on the distance between the focal plane corresponding to the object dart pin and the camera and the location information regarding how far the object dart pin attachment location is to the left or right from the reference line.

The input-output interface 130 may be connected to an external device to receive data on an input image for performing the dart pin location calculation. For example, the input-output interface 130 may be communicatively coupled with one or more cameras disposed around the dart target plate to receive plenoptic video data for the dart target plate. Here, the input-output interface 130 may further include hardware modules such as a network interface card, a network interface chip, and a networking interface port, or the like, or software modules such as a network device driver or a networking program, to configure the communication connection.

The input-output interface 130 may transmit image data generated by the processor 120 to a display device linked with the dart pin locating apparatus 100. Here, the display device may include at least one of a liquid crystal display (LCD), a thin film transistor-liquid crystal display (TFT LCD), and an organic light-emitting diode (OLED).

The input-output interface 130 may transmit a dart pin image generated by the processor 120 or an image displaying a dart game score corresponding to a dart pin location calculated by the processor 120 to the above-described display device. For example, when a dart pin thrown by a participant in a dart game is attached to the dart target plate, the processor 120 may calculate a location where the dart pin is attached, and based on the location of the attachment, generate and transmit to the display device a preset image including a scene of the dart pin as attached to the dart target plate and a score indication.

The memory 140 may include volatile, non-volatile, virtual, or other kinds of memory for storing information used by or outputted by the dart pin locating apparatus 100. For example, the memory 140 may include random access memory (RAM) or dynamic RAM (DRAM).

The memory 140 stores default programs, software applications, network setup information, and the like for the operation of the dart pin locating apparatus 100. Additionally, the memory 140 may provide the stored information upon request of any one of the camera unit 110 and the processor 120.

The memory 140 may store various data for processing or controlling the dart pin locating apparatus 100. For example, the memory 140 may store plenoptic video data of a dart target plate, setting information of the multiple preset focal planes, an object detection model that is completely trained with detecting an object dart pin from an extracted image for the object dart pin, and the like.

In addition, the memory 140 may store various data generated by the dart pin locating apparatus 100. For example, the memory 140 may store an extracted image of the object dart pin generated by the processor 120, and information on the attachment location of the object dart pin calculated by the processor 120, and the like.

Figure 2:
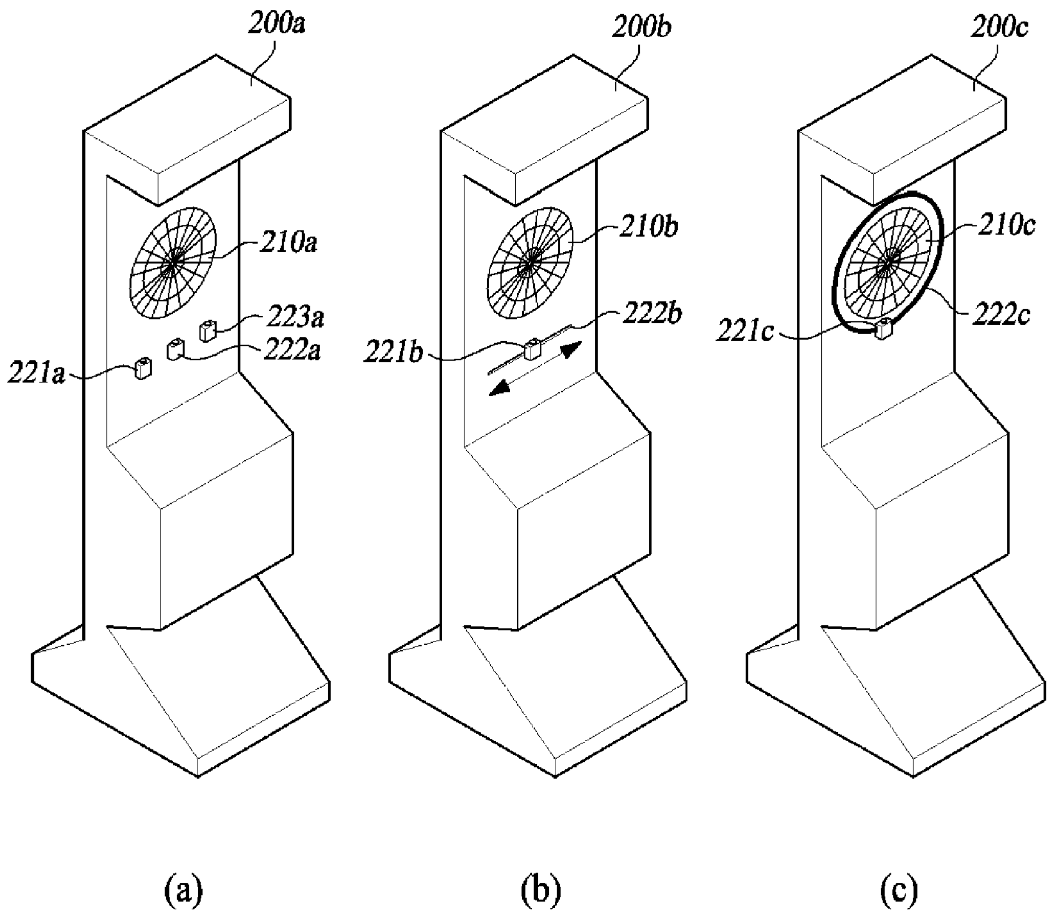
FIG. 2 is a diagram of various embodiments where the dart pin locating apparatus of the present disclosure captures plenoptic videos of a dart target plate.

FIG. 2 is a diagram of various embodiments where the dart pin locating apparatus of the present disclosure captures plenoptic videos of a dart target plate.

FIG. 2 (*a*) illustrates a process performed by a dart pin locating apparatus according to at least one embodiment of the present disclosure for capturing plenoptic videos of a dart target plate by using cameras 221*a*, 222*a*, 223*a* disposed at preset locations around a dart target plate 210*a*.

Referring to FIG. 2 (*a*), a dart game apparatus 200*a* includes the dart target plate 210*a* and the cameras 221*a*, 222*a*, 223*a*. Here, the cameras 221*a*, 222*a*, 223*a* may include at least one of a pinhole camera and a light field camera including a lens array.

The locations of the cameras 221*a*, 222*a*, 223*a* may be spaced at predetermined intervals to form a one-dimensional array of cameras at the bottom of the dart target plate 210*a*, but are not limited to this configuration. For example, the cameras may be spaced at regular intervals along the perimeter of the dart target plate 210*a*, or may be spaced at the top or left or right of the dart target plate 210*a*. Additionally, a single light field camera installed at a single point may be used in place of these cameras.

The cameras 221*a*, 222*a*, 223*a* take plenoptic videos of the dart target plate 210*a* at their respective locations. The dart pin locating apparatus may generate refocused images for the multiple preset focal planes based on the plenoptic videos of the dart target plate 210A taken by the cameras 221*a*, 222*a*, 223*a*. Here, since the positions from which the cameras 221*a*, 222*a*, 223*a* photographed the dart target plate 210*a* are different, the dart pin locating apparatus aligns the three refocused images corresponding to one focal plane to generate one final refocused image.

Referring to FIG. 2 (*b*), a dart pin locating apparatus according to another embodiment of the present disclosure illustrates a process of moving one camera 221B along a straight path and taking plenoptic videos of a dart target plate.

Referring to FIG. 2 (*b*), a dart game apparatus 200*b* includes a dart target plate 210*b*, a camera 221*b*, and a camera sliding unit 222*b*. Here, the camera 221*b* may be a pinhole camera or a light field camera including a lens array.

The camera sliding unit 222*b* may move the camera 221*b* to a plurality of preset positions along a linear path. For example, the camera 221*b* may be moved from side to side by a sliding rail or roller provided on the camera sliding unit 222*b* to capture plenoptic videos of the target plate 210*b* from a plurality of different positions. This allows a single camera to be utilized to capture plenoptic videos as with an array camera.

The dart pin locating apparatus may generate refocused images for the multiple preset focal planes based on the plenoptic videos of the dart target plate 210B taken by the camera 221*b* from the multiple different positions.

Referring to FIG. 2 (*c*), a dart pin locating apparatus according to yet another embodiment of the present disclosure illustrates a process of moving one camera 221C along a circular path to take plenoptic videos of a dart target plate.

Referring to FIG. 2 (*c*), a dart game apparatus 200*c* includes a dart target plate 210*c*, a camera 221*c*, and a camera sliding unit 222*c*. Here, the camera sliding unit 222*c* may be formed in a circle along the perimeter of the dart target plate 210*c*, but is not limited to this configuration, and may be formed on a portion of the periphery of the dart target plate 210*c*. For example, the camera sliding unit 222*c* may be formed in the form of a semi-circular arc along the perimeter of the dart target plate 210*c*.

The camera sliding unit 222*c* may move the camera 221*c* to multiple preset positions along the circular path and may capture plenoptic videos of the target plate 210*c* from the multiple different positions.

Figure 3:
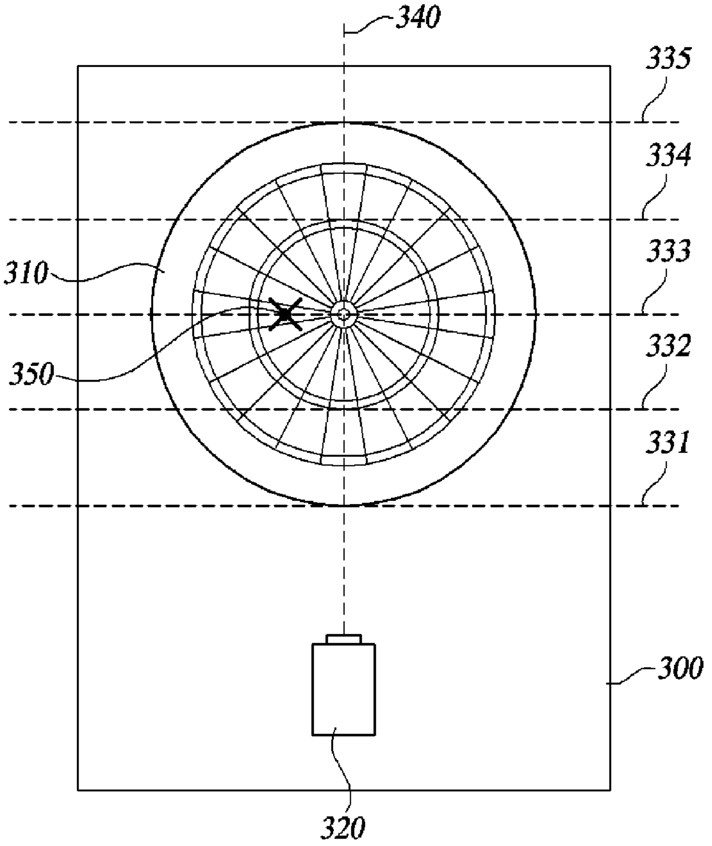
FIG. 3 is a diagram of a process of generating a plurality of refocused images by a dart pin locating apparatus.

FIG. 3 is a diagram of a process of generating a plurality of refocused images by a dart pin locating apparatus according to at least one embodiment of the present disclosure.

Referring to FIG. 3, a dart game device has a front panel 300 installed with a dart target plate 310 with a camera 320 installed at the bottom of the dart target plate 310. Here, the camera 320 may be a light field camera including a lens array. Coincidentally, an object dart pin 350 is attached at a random location on the dart target plate 310.

The camera 320 may be installed such that its frontal optical axis is aligned with a baseline 340 passing through a bull's eye in the center of dart target plate 310. Accordingly, a distance between the attachment location of the object dart pin 350 and the baseline 340 may be calculated based on the distance between the imaged location of the object dart pin 350 and the imaged centerline of the image as they exist in the image taken by the camera 320.

The dart pin locating apparatus generates refocused images for the multiple preset focal planes based on the plenoptic video taken by the camera 320. Here, the multiple preset focal planes may be set at regular intervals on the scoring region of the dart target plate 310 based on the distances from the camera plane of the camera 320.

The multiple preset focal planes may include a first focal plane 331 including the nearest boundary of the scoring region from the camera plane, a fifth focal plane 335 including the farthest boundary of the scoring region, a second focal plane 332 disposed between the first focal plane 331 and the fifth focal plane 335 at an interval corresponding to a quarter of a diameter length of the dart target plate 310, a third focal plane 331, and a fourth focal plane 334.

In this embodiment, the multiple preset focal planes are set to five focal planes, but the number of focal planes may be set to a greater number. For example, the spacing between the plurality of focal planes may be set to an interval equal to the diameter length of the dart pin shaft so that an object dart pin and a different dart pin among the plurality of dart pins attached to the dart target plate 310 may each be included in a different refocused image.

The dart pin locating apparatus generates a first refocused image for the first focal plane 331. In the first refocused image, all objects other than those located on the first focal plane 331 appear blurred. Here, the further away the object is from the first focal plane 331, the more blurred it appears.

Since there is no dart pin present at a location corresponding to the first focal plane 331, in the first refocused image, the shape at a location close to the first focal plane 331 on the dart target plate 310 appears sharply, and the shape at a location farther from the first focal plane 331 appears blurred. The first refocused image may include a blurred region of the object dart pin 350.

The dart pin locating apparatus generates a second refocused image for the second focal plane 332. As with the first refocused image, the second refocused image includes sharper features of portions of the dart target plate 310 close to the second focal plane 332, and blurred features elsewhere.

The dart pin locating apparatus generates a third refocused image for the third focal plane 333. Since the object dart pin 350 exists at a location corresponding to the third focal plane 333, the shape of the object dart pin 350 appears sharply in the third refocused image.

The dart pin locating apparatus generates a fourth refocused image and a fifth refocused image for the fourth focal plane 334 and the fifth focal plane 335, respectively. As with the first refocused image and the second refocused image, the object dart pin 350 is shown with a blurred shape in the fourth refocused image and the fifth refocused image. Here, since the fourth focal plane 334 than the fifth focal plane 335 is closer to the object dart pin 350, the object dart pin 350 in the fifth refocused image may appear relatively more blurred.

Using the distance information between the camera 320 and the third focal plane 333, where the object dart pin 350 is located, and the location of the object dart pin 350 relative to the reference line 340, the dart pin locating apparatus may determine a point where the object dart pin 350 is attached, and calculate a location on the dart target plate 310 corresponding to the point where the object dart pin 350 is attached.

Figure 4:
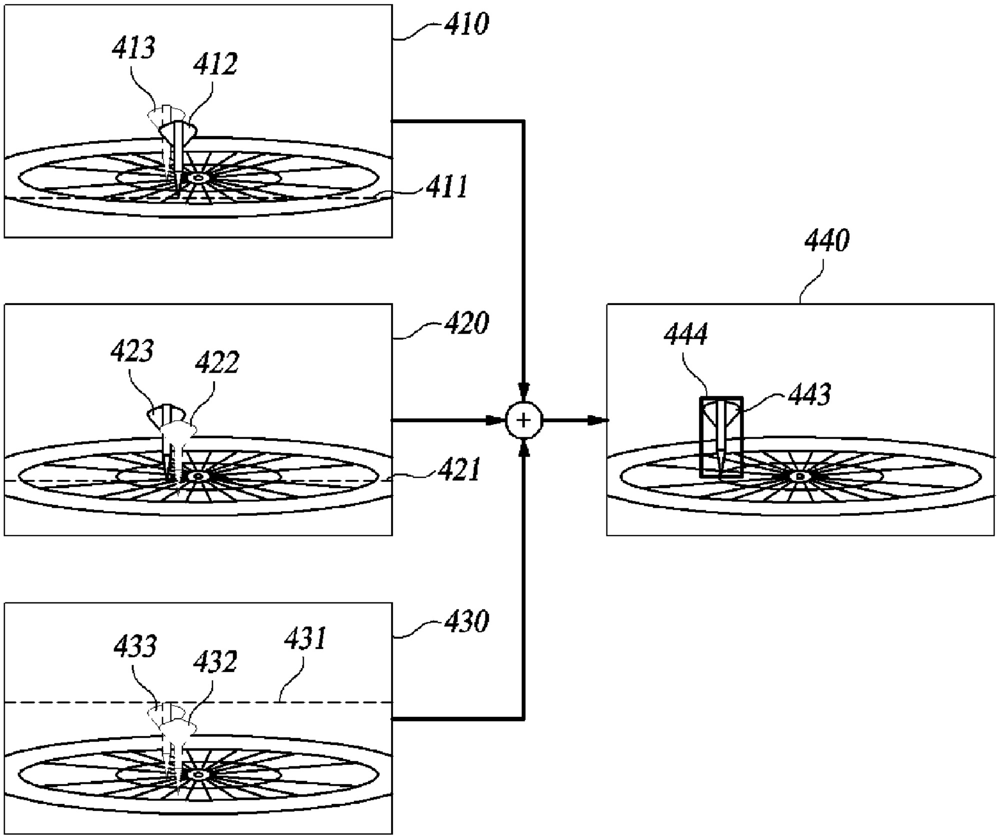
FIG. 4 is a diagram of a process of generating an extracted image for an object dart pin by a dart pin locating apparatus.

FIG. 4 is a diagram of a process of generating an extracted image for an object dart pin by a dart pin locating apparatus according to at least one embodiment of the present disclosure.

Referring to FIG. 4, obstacle dart pins 412, 422, 432 attached to the dart target plate cause obscuration of the object dart pins 413, 423, 433, 443. Based on the plenoptic video of the dart target plate, the dart pin locating apparatus generates a first refocused image 410, a second refocused image 420, and a third refocused image 430 corresponding respectively to the preset first focal plane 411, preset second focal plane 421, and preset third focal plane 431.

The first refocused image 410 includes the obstacle dart pin 412 located on the first focal plane 411 and the object dart pin 413 located behind the first focal plane 411. Here, the shape of the obstacle dart pin 412 appears as a sharp shape because it is on the focal plane, while the object dart pin 413 appears as a blurred shape.

The second refocused image 420 includes the object dart pin 423 located on the second focal plane 421 and the obstacle dart pin 422 located in front of the second focal plane 421. Contrary to the first refocused image 410, the second refocused image 420 exhibits the object dart pin 423 as a sharp shape and the obstacle dart pin 422 appears as a blurred shape.

In the third refocused image 430, neither the obstacle dart pin 432 nor the object dart pin 433 is located on the third focal plane 431. Therefore, both the obstacle dart pin 432 and the object dart pin 433 appear as blurred shapes.

The dart pin locating apparatus merges the refocused images 410, 420, 430 for the different focal planes to generate an extracted image 440 for the object dart pin 443.

The dart pin locating apparatus merges the three refocused images by applying a first weight to the second refocused image 420 where the shape of the object dart pin is sharply visible, and applying a second weight to the first refocused image 410 and the third refocused image 430. Here, the first weight may be set to a value that is larger than the second weight. According to another embodiment, the first refocused image 410 and the third refocused image 430 may be applied with different weights that are smaller than the weight value of the second refocused image 420.

In the extracted image 440, the region corresponding to the first focal plane 411 is the result of merging (i) an image obtained from the second refocused image 420 having a low sharpness with a relatively large value of the first weight applied, (ii) an image obtained from the third refocused image 430 having a low sharpness with a relatively small value of the second weight applied, and (iii) an image from the first refocused image 410 having a high sharpness with a relatively small value of the second weight applied. Thus, objects in the region corresponding to the first focal plane 411 appear to be less sharp. Specifically, the shape of the obstacle dart pin present in the first focal plane 411 is blurred or removed to the extent that it cannot be identified in the extracted image 440.

In the extracted image 440, the region corresponding to the second focal plane 421 is the result of merging (i) an image obtained from the second refocused image 420 having high sharpness with a relatively large first weight applied, (ii) an image obtained from the first refocused image 410 having a low sharpness with a relatively small second weight applied, and (iii) an image obtained from the third refocused image 430 having a low sharpness with the relatively small second weight applied. Thus, objects in the region corresponding to the second focal plane 421 appear to be sharper. Specifically, the shape of the object dart pin 443 that was present in the second focal plane 421 appears with high sharpness in the extracted image 440.

As a result, the regions of the obstacle dart pins in the extracted image 440 are blurred to remove the shape of the obstacle dart pins, and the region of the object dart pin 443 appears to be sharp.

The dart pin locating apparatus utilizes the completely trained dart pin detection model to detect the location of the object dart pin. The dart pin detection model may detect a region of the object dart pin 443 present in the extracted image 440, and the dart pin locating apparatus may calculate an attachment location of the object dart pin 443 based on a bounding-box 444 of the region of the object dart pin 443.

Figure 5:
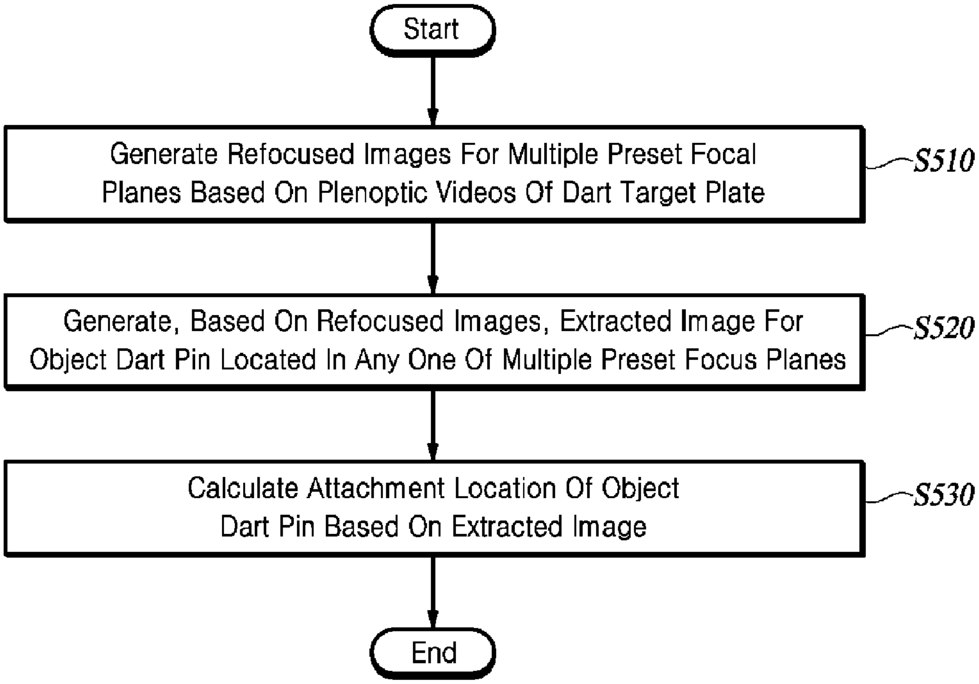
FIG. 5 is a flowchart of a dart pin locating method.

FIG. 5 is a flowchart of a dart pin locating method according to at least one embodiment of the present disclosure.

Referring to FIG. 5, the dart pin locating apparatus generates refocused images for multiple preset focal planes based on plenoptic videos of the dart target plate (S510).

The dart pin locating apparatus may capture the plenoptic videos of the dart target plate by using at least one or more cameras disposed around the dart target plate. At least one camera may be, but is not limited to, a single light field camera including a lens array. For example, the cameras may be a plurality of cameras positioned around the dart target plate at preset intervals to generate plenoptic information. The plurality of cameras may be implemented to include at least one of a pinhole camera and a light field camera including a lens array.

The dart pin locating apparatus may change a focal plane for the spatial dart-target region inclusive of the dart target plate to generate refocused images of the respective ones of the multiple preset focal planes. Here, the multiple preset focal planes may be set at regular intervals on the scoring region of the dart target plate based on a distance from the camera plane.

The refocused image for one focal plane sharply exhibits objects located on that focal plane and exhibits other objects blurred. For example, among a plurality of dart pins attached to the dart target plate, a dart pin of interest located in the same plane as the focal plane appears relatively sharp in the refocused image, and other dart pins located at points closer to or farther away than the dart pin of interest from the camera position, which is a reference position, appear relatively blurred as their distances from the focal plane increase.

The dart pin locating apparatus may sequentially refocus on the multiple preset focal planes having different focal lengths to generate a plurality of refocused images equal in number to the focal planes. Here, the plurality of refocused images may constitute a focal stack, which is a set of plenoptic images of the dart target plate.

Based on the plurality of refocused images, the dart pin locating apparatus generates an extracted image for an object dart pin located in any one focal plane of the multiple preset focal planes (S520).

The dart pin locating apparatus determines, among the refocused images for the multiple preset focal planes, one refocused image with the object dart pin located in its focal plane, as the reference refocused image. Here, the dart pin locating apparatus may determine the reference refocused image based on, but is not limited to, whether the object dart pin is detected in a region of pixels having a high sharpness among the pixels constituting the one refocused image. For example, the present disclosure may use an object detection model trained to detect a dart pin of a certain sharpness or higher to detect a dart pin for each of a plurality of refocused images for the multiple preset focal planes and determine any one refocused image with the object dart pin detected, as the reference refocused image.

The dart pin locating apparatus generates the extracted image for the object dart pin by merging the reference refocused image with at least one other refocused image among the refocused images for the multiple preset focal planes.

In a refocused image, the shapes of objects present in the relevant focal plane are sharpened and the shapes of other objects are blurred. Thus, in the reference refocused image, the shape of the object dart pin present in the focal plane is sharpened, but the shapes of all other dart pins not present in the focal plane are blurred. On the other hand, other refocused images may have a different focal plane than the reference refocused image, such that the object dart pin may appear blurred and the other dart pins may appear sharp.

The dart pin locating apparatus calculates a weighted sum by applying different weights to the reference refocused image and one or more other refocused images. Specifically, the dart pin locating apparatus may apply a preset first weight to the reference refocused image that sharply exhibits a region with the object dart pin and apply a second weight having a value that is relatively smaller than the first weight to the other refocused image that sharply exhibits a region without the object dart pin.

Based on the weighted sum values for the differently weighted reference refocused image and the other refocused images, the dart pin locating apparatus generates an extracted image for the object dart pin, which is a merger of the plurality of refocused images.

As a result of applying the first weight of a relatively larger value to the reference refocused image than to the other refocused images, the difference, on the merged image, between the sharpness of the objects existing in the focal plane corresponding to the reference refocused image and the sharpness of the objects existing in the other focal plane becomes larger. Over the extracted image, the region with the object dart pin becomes sharply visible relative to the other regions. Thus, among a plurality of dart pins attached to the dart target plate, the shape of the object dart pin appears with high sharpness, while the other dart pins may be blurred or removed due to a decrease in sharpness.

Here, the weight may be applied to pixel values in the corresponding refocused image, but is not limited to be applied to the pixel values in the corresponding refocused image. For example, a Laplace filter may be applied to the refocused image. The resultant filtered image or the refocused image may give a blur metric as a basis for obtaining pixel location-specific sharpness values. The weight may be applied to pixel location-specific sharpness values to selectively enhance the sharpness of the object dart pin located in the focal plane corresponding to the reference refocused image in the extracted image.

The dart pin locating apparatus calculates the attachment location of the object dart pin based on the extracted image (S530).

The dart pin locating apparatus detects the object dart pin present in the extracted image by using a dart pin detection model pre-trained by using a deep learning algorithm. Here, the pre-trained dart pin detection model may be a detection model based on a deep learning algorithm that is trained to detect a dart pin present in the extracted image by using a dart target plate image including dart pins attached to various locations as training data.

The dart pin locating apparatus generates the location information of the object dart pin based on the detection data for the object dart pin, outputted by the dart pin detection model. Here, the detection data for the object dart pin may be data regarding the location and size of the dart pin, such as a center coordinate value, an elevation, and a width of a bounding-box for the detected object dart pin region.

The dart pin locating apparatus may generate the location information of the object dart pin based on the coordinates of a preset reference point on the extracted image. The preset reference point may be set to a location where the object dart pin is attached, such as a point where the tip of the dart pin and the dartboard plate are in contact. Based on the horizontal coordinates of the reference point in the extracted image, the dart pin locating apparatus may generate location information regarding how far the location where the object dart pin is attached is to the left or right of a reference line set along the frontal optical axis of the camera.

The dart pin locating apparatus may calculate the exact attachment point of the object dart pin by using the distance information from the focal plane corresponding to the object dart pin to the camera and the location information regarding how far the object dart pin attachment location is to the left or right from the reference line.

A method for detecting the location of a dart pin attached to a dart target plate may comprise one or more operations described above. The method may be implemented in a non-transitory computer-readable medium storing instructions that, when executed, cause performance of one or more operations described herein.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of detecting a location of a dart pin attached to a dart target plate, the method comprising:

generating refocused images for multiple preset focal planes based on plenoptic videos of the dart target plate, which are obtained by using one or more cameras disposed around the dart target plate;

generating, based on the refocused images, an extracted image for an object dart pin located in one focal plane of the multiple preset focal planes, wherein the extracted image for the object dart pin is an image cleared of a dart pin present on a focal plane different from the focal plane of the object dart pin, among a plurality of dart pins attached to the dart target plate; and determining an attachment location of the object dart pin based on the extracted image.

2. The method of claim 1, wherein the camera disposed around the dart target plate comprises:

a single light field camera comprising a lens array.

3. The method of claim 1, wherein the cameras disposed around the dart target plate comprise:

a plurality of cameras disposed around the dart target plate at preset intervals.

4. The method of claim 3, wherein the plurality of cameras comprise:

at least one of a pinhole camera and a light field camera comprising a lens array.

5. The method of claim 1, wherein the generating of the extracted image for the object dart pin located in a focal plane of the multiple preset focal planes based on the refocused images comprises:

determining, among the refocused images of the multiple preset focal planes, one refocused image of a focal plane that covers the object dart pin, as a reference refocused image; and merging the reference refocused image with at least one other refocused image among the refocused images for the multiple preset focal planes to generate the extracted image for the object dart pin.

6. The method of claim 5, wherein the merging of the reference refocused image with at least one other refocused image among the refocused images for the multiple preset focal planes to generate the extracted image for the object dart pin comprises:

determining a weighted sum by applying different weights to the reference refocused image and the at least one other refocused image.

7. The method of claim 1, wherein the determining of the attachment location of the object dart pin based on the extracted image comprises:

obtaining location information of the object dart pin on the extracted image; and determining the attachment location of the object dart pin based on the location information and distance information of a focal plane corresponding to the object dart pin.

8. A computer-readable recording medium storing a computer program, wherein the computer program comprises:

instructions for causing a processor to perform the method according to claim 1.

9. An apparatus for detecting a location of a dart pin, comprising:

one or more cameras disposed around a dart target plate;

a memory configured to store one or more instructions; and one or more processors configured to execute the one or more instructions stored in the memory, wherein the processor, by executing the one or more instructions, performs steps comprising:

generating refocused images for multiple preset focal planes based on plenoptic videos of the dart target plate, which are obtained by using the cameras disposed around the dart target plate;

generating, based on the refocused images, an extracted image for an object dart pin located in one focal plane of the multiple preset focal planes, wherein the extracted image for the object dart pin is an image cleared of a dart pin present on a focal plane different from the focal plane of the object dart pin, among a plurality of dart pins attached to the dart target plate; and determining an attachment location of the object dart pin based on the extracted image.

10. The apparatus of claim 9, wherein the camera disposed around the dart target plate comprises:

a single light field camera comprising a lens array.

11. The apparatus of claim 9, wherein the cameras disposed around the dart target plate comprise:

a plurality of cameras disposed around the dart target plate at preset intervals.

12. The apparatus of claim 11, wherein the plurality of cameras comprise:

at least one of a pinhole camera and a light field camera comprising a lens array.

13. The apparatus of claim 9, wherein the processor performs steps comprising:

determining, among the refocused images for the multiple preset focal planes, one refocused image of a focal plane that covers the object dart pin, as a reference refocused image; and merging the reference refocused image with at least one other refocused image among the refocused images for the multiple preset focal planes to generate the extracted image for the object dart pin.

14. The apparatus of claim 13, wherein the processor performs a step of:

determining a weighted sum by applying different weights to the reference refocused image and the at least one other refocused image.

15. The apparatus of claim 9, wherein the processor performs steps comprising:

obtaining location information of the object dart pin on the extracted image; and determining the attachment location of the object dart pin based on the location information and distance information of a focal plane corresponding to the object dart pin.

* * * * *